(12) United States Patent
Gerken et al.

(10) Patent No.: US 9,840,338 B2
(45) Date of Patent: Dec. 12, 2017

(54) ELECTRIC CHARGE DISSIPATION SYSTEM FOR AIRCRAFT

(75) Inventors: Noel Timothy Gerken, Maple Valley, WA (US); Quynhgiao Nguyen Le, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 13/343,443

(22) Filed: Jan. 4, 2012

(65) Prior Publication Data

US 2013/0009001 A1    Jan. 10, 2013

Related U.S. Application Data

(63) Continuation-in-part of application No. 12/959,449, filed on Dec. 3, 2010.

(51) Int. Cl.
*B64D 45/02* (2006.01)
*B64D 37/06* (2006.01)
*B64D 37/32* (2006.01)
*H05F 3/00* (2006.01)

(52) U.S. Cl.
CPC .......... *B64D 45/02* (2013.01); *B64D 37/32* (2013.01); *Y02T 50/44* (2013.01)

(58) Field of Classification Search
CPC . B32B 1/02; B32B 2250/24; B32B 2262/103; B32B 2307/02; B32B 2439/00
USPC ............ 428/297.4, 297.7, 299.1; 244/1 A; 264/248; 361/220, 216; 220/62.19, 905, 220/4.12, 4.14; 204/196.37
See application file for complete search history.

(56) References Cited

U.S. PATENT DOCUMENTS

| | | | |
|---|---|---|---|
| 3,102,972 A | | 9/1963 | Andresen |
| 3,906,308 A | | 9/1975 | Amason et al. |
| 4,482,912 A | * | 11/1984 | Chiba et al. ............... 257/746 |
| 5,973,903 A | | 10/1999 | Tomerlin |
| 6,468,613 B1 | * | 10/2002 | Kitano ............... B32B 15/08 428/113 |
| 6,823,903 B2 | | 11/2004 | Davis |
| 6,920,031 B2 | | 7/2005 | Sprenger et al. |
| 7,277,266 B1 | | 10/2007 | Le et al. |
| 7,770,848 B2 | | 8/2010 | Johnson et al. |

(Continued)

FOREIGN PATENT DOCUMENTS

| | | |
|---|---|---|
| EP | 2399739 A1 | 12/2011 |
| JP | H03229495 A | 10/1991 |

(Continued)

OTHER PUBLICATIONS

International Search Report and Written Opinion, dated Feb. 2, 2012, regarding Application No. PCT/US2011/058100, 10 pages.

(Continued)

*Primary Examiner* — Camie Thompson
(74) *Attorney, Agent, or Firm* — Yee & Associates, P.C.

(57) ABSTRACT

A method and apparatus comprising a first composite layer and a second composite layer in which the second composite layer is associated with the first composite layer. The first composite layer and the second composite layer form a structure. The second composite layer has a conductivity configured to dissipate an electric charge on a surface of the structure and limit a flow of an electrical current in the second composite layer in which the electrical current is caused by an electromagnetic event.

20 Claims, 7 Drawing Sheets

(56) References Cited

U.S. PATENT DOCUMENTS

| | | | |
|---|---|---|---|
| 2003/0019292 | A1 | 1/2003 | Robinson et al. |
| 2007/0177330 | A1 | 8/2007 | Ackerman et al. |
| 2008/0308678 | A1 | 12/2008 | Purdy et al. |
| 2009/0140098 | A1 | 6/2009 | Lengsfeld et al. |
| 2010/0072207 | A1* | 3/2010 | Inaba ................ B32B 27/08 220/495.06 |
| 2011/0014356 | A1* | 1/2011 | Fornes ................ H05K 9/0083 427/58 |
| 2011/0114189 | A1 | 5/2011 | Crain et al. |
| 2011/0159764 | A1 | 6/2011 | Price et al. |
| 2011/0297315 | A1 | 8/2011 | Kishida et al. |
| 2011/0247203 | A1 | 10/2011 | Lopez-Reina Torrijos |
| 2011/0284694 | A1* | 11/2011 | Yamaguchi ............ B64C 3/34 244/135 R |
| 2011/0297790 | A1* | 12/2011 | Yamaguchi et al. ...... 244/135 R |
| 2011/0315818 | A1* | 12/2011 | Chao .................. B64D 37/32 244/1 A |
| 2012/0138609 | A1 | 6/2012 | Gerken et al. |
| 2012/0141763 | A1 | 6/2012 | Cawse et al. |
| 2013/0330514 | A1* | 12/2013 | Cawse et al. ................ 428/143 |

FOREIGN PATENT DOCUMENTS

| | | | |
|---|---|---|---|
| JP | H05117446 | A | 5/1993 |
| JP | H07228707 | A | 8/1995 |
| JP | 2001011216 | | 1/2001 |
| JP | 2008231395 | A | 10/2008 |
| JP | 2010508416 | A | 3/2010 |
| JP | 2010194749 | A | 9/2010 |
| JP | 2010235133 | A | 10/2010 |
| JP | 2011219766 | A | 11/2011 |
| WO | WO2008056123 | A1 | 5/2008 |
| WO | WO2010/064463 | * | 6/2010 |
| WO | WO2010095536 | A | 8/2010 |
| WO | WO2010113793 | * | 10/2010 |

OTHER PUBLICATIONS

Office Action, dated Mar. 11, 2013, regarding U.S. Appl. No. 12/959,449, 14 pages.
International Search Report and Written Opinion, dated Jun. 28, 2013, regarding Application No. PCT/US2012/062627, 11 pages.
Final Office Action, dated Sep. 12, 2013, regarding U.S. Appl. No. 12/959,449, 7 pages.
International Preliminary Report on Patentability and Written Opinion, dated Jul. 8, 2014, regarding Application No. PCT/US2012/062627, 6 pages.
Notice of Reasons for Rejection and English Translation, issued Jul. 14, 2015, regarding Japanese Application No. 2013-542001, 7 pages.
Notification of Second Office Action and English Translation, issued Jul. 14, 2015, regarding Chinese patent Application No. 201180058173.3, 21 pages.
Office Action, dated Apr. 14, 2015, regarding U.S. Appl. No. 12/959,449, 17 pages.
Office Action, dated Dec. 31, 2014, regarding U.S. Appl. No. 12/959,449, 16 pages.
State Intellectual Property Office of China Second Notification of Office Action and English translation, regarding Application No. 2012800660617, dated Mar. 24, 2016, 15 pages.
Notices of Reasons for Rejection and English Translation, issued Mar. 8, 2016, regarding Japanese Patent Application No. 2013-542001, 4 pages.
Office Action, dated May 19, 2016, regarding U.S. Appl. No. 12/959,449, 19 pages.
Canadian Intellectual Property Office Communication, dated Sep. 22, 2016, regarding Application No. 2813430, 3 pages.
Japanese Office Action, dated Sep. 6, 2016, regarding Application No. 2013-542001, 5 pages.
Chinese Office Action, dated Sep. 23, 2016, regarding Application No. 201280066061.7, 15 pages.
Carruthers et al., "Lord Ultraconductive Materials for Lightning Strike Protection of Composite Aircraft," LORD corporation, 2012, 14 pages.
Fornes, et al., "Self-assembling Conductive coatings and Their use in Lightning Strike and Electromagnetic Interference Protection," Chemical Research & Development, LORD Corporation, 2013, 9 pages.
Final Office Action, dated Oct. 6, 2016, regarding U.S. Appl. No. 12/959,449, 18 pages.
State Intellectual Property Office of China Notification of Fifth Office Action and English translation, regarding Application No. 2012800660617, dated Dec. 22, 2016, 21 pages.
Office Action, dated Feb. 3, 2017, regarding U.S. Appl. No. 12/959,449, 16 pages.
State Intellectual Property Office of China Notification of Fourth Office Action and English translation, dated Apr. 13, 2017, regarding Application No. 2012800660617, 24 pages.
State Intellectual Property Office of China Notification of Decision of Rejection, dated Apr. 27, 2017, regarding Application No. 2011800581733, 27 pages.
U.S. Appl. No. 12/959,449, filed Dec. 3, 2010, Gerken et al.
Office Action, dated Jun. 17, 2014, regarding U.S. Appl. No. 12/959,449, 12 pages.
Japanese Office Action and English translation, dated Jul. 11, 2017, regarding Application No. 2014-551240, 7 pages.

* cited by examiner

ELECTRIC CHARGE DISSIPATION SYSTEM FOR AIRCRAFT

CROSS-REFERENCE TO RELATED APPLICATION

This application is a continuation-in-part of U.S. patent application Ser. No. 12/959,449, filed Dec. 3, 2010, entitled "Electric Charge Dissipation System for Aircraft", which is incorporated herein by reference.

BACKGROUND INFORMATION

1. Field

The present disclosure relates generally to aerospace platforms and, in particular, to structures in aerospace platforms. Still more particularly, the present disclosure relates to a method and apparatus for dissipating electric charges on surfaces in aerospace platforms.

2. Background

Static electricity is a build-up of an electric charge on the surface of an object. The object may be an aerospace platform, such as, for example, an aircraft, a spacecraft, or some other type of aerospace platform. Static electricity may build up on various surfaces on an aircraft. For example, static electricity may build up on a surface of a fuel tank in the aircraft. The dissipation of static electricity may be desirable to reduce the possibility of a discharge of static electricity within a structure.

Many fuel tanks in aircraft are comprised of aluminum. This material often provides a desired level of dissipation of the electric charge. If greater dissipation of the electric charge is desired, other mechanisms may be used. For example, grounding technologies and materials have been developed to dissipate the electric charge that forms static electricity. Additionally, additives have been placed into liquids, such as fuel, to reduce the formation and aid in the dissipation of static electricity.

With the use of composite materials in place of metals, the manner in which static electricity is handled in structures, such as fuel tanks, changes. With aluminum, these charges may dissipate because of the conductivity of the structure. With composite materials, however, surface conductivity may not be present or as high as with metals. As a result, static electricity may build up more easily on surfaces of fuel tanks using composite materials.

Therefore, it would be desirable to have a method and apparatus that takes into account at least some of the issues discussed above, as well as possibly other issues.

SUMMARY

In one illustrative embodiment, an apparatus comprises a first composite layer and a second composite layer in which the second composite layer is associated with the first composite layer. The first composite layer and the second composite layer form a structure. The second composite layer has a conductivity configured to dissipate an electric charge on a surface of the structure and limit a flow of an electrical current in the second composite layer in which the electrical current is caused by an electromagnetic event.

In another illustrative embodiment, a composite fuel tank for an aircraft comprises a wall having a first composite layer and a second composite layer. The second composite layer is located on the first composite layer in an interior of the composite fuel tank. The first composite layer and the second composite layer form a structure. The second composite layer is configured to dissipate an electric charge on a surface in the interior of the composite fuel tank and limit a flow of an electrical current on the surface in the interior of the composite fuel tank in which the electrical current is caused by an electromagnetic event.

In yet another illustrative embodiment, a method is present for operating a platform. The platform is operated in which the platform has a structure comprising a first composite layer and a second composite layer associated with the first composite layer. The second composite layer has a conductivity configured to dissipate an electric charge on a surface of the structure and limit a flow of an electrical current in the second composite layer in which the electrical current is caused by an electromagnetic event.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

Figure 1:
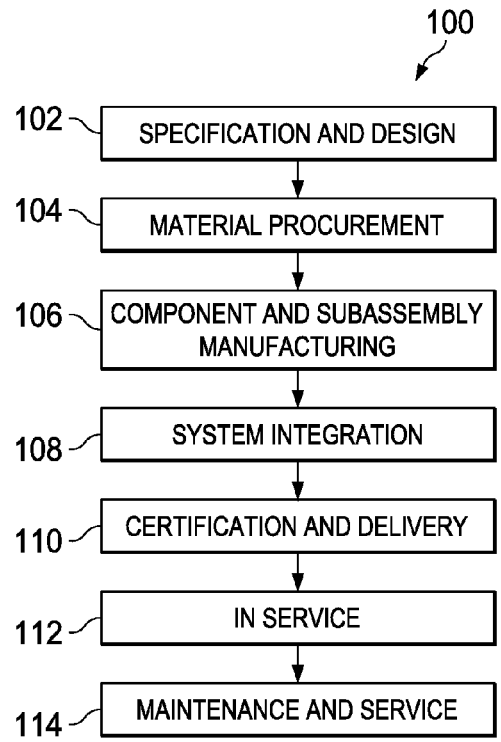
FIG. 1 is an illustration of an aircraft manufacturing and service method in accordance with an illustrative embodiment.
Figure 2:
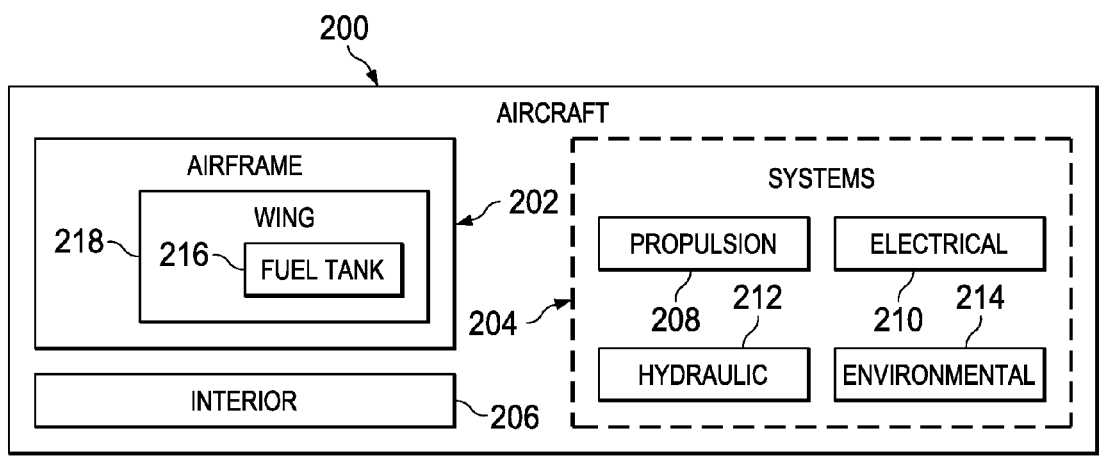
FIG. 2 is an illustration of an aircraft in which an illustrative embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an illustrative embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an illustrative embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different illustrative embodiments may be applied to other industries, such as the automotive industry.

The different illustrative embodiments may be implemented within airframe 202 in the depicted examples. For example, one or more of the different illustrative embodiments may be implemented in a structure, such as fuel tank 216 in wing 218 of airframe 202 for aircraft 200.

In these illustrative examples, fuel tank 216 in wing 218 may be comprised of composite materials. These composite materials may include, for example, carbon fiber reinforced composite materials. These components may be comprised partially or entirely of composite materials, depending on the particular implementation. The different illustrative embodiments may be implemented to manage an electric charge that may form on the interior surfaces of fuel tank 216.

Apparatuses and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

A number, when referring to items, means one or more items. For example, a number of apparatus embodiments is one or more apparatus embodiments.

A number of apparatus embodiments, method embodiments, or a combination thereof may be utilized while aircraft 200 is in service 112 and/or during maintenance and service 114 in FIG. 1. The use of a number of the different illustrative embodiments may substantially expedite the assembly of and/or reduce the cost of aircraft 200.

The different illustrative embodiments recognize and take into account a number of considerations. For example, the different illustrative embodiments recognize and take into account that primers may be used to manage the dissipation of electric charges on the surfaces of the fuel tank. The different illustrative embodiments recognize and take into account that this mechanism, however, may not provide the desired amount of dissipation of electric charges, such as static electricity.

The different illustrative embodiments recognize and take into account that primers may be formulated to provide increased dissipation of electric charges as compared to currently available primers. Additionally, the application of the primers may be performed to increase dissipation of electric charges. For example, the thickness of the primer placed on the surface of the fuel tank may be selected to increase dissipation of electric charges. Use of these primers, however, may increase the expense of manufacturing structures, such as fuel tanks, from composite materials.

The different illustrative embodiments also recognize and take into account that, with the use of primers and other mechanisms to dissipate electric charges that may build up on the surface of structures, the complexity and weight of the aircraft may increase more than desired. The different illustrative embodiments recognize and take into account that it may be desirable to have a layer that allows electric charges to be dissipated in place of or in addition to the primer. When both the primer and the additional layer that allows electric charges to be dissipated are present, redundant electric charge dissipation is provided.

Time and personnel are needed to apply primers to the interior surfaces of the fuel tank. Applying the appropriate amount of primer to obtain a desired amount of dissipation may require inspections and additional operations to be performed to ensure that the desired amount of primer is present. Additionally, time and personnel may also be needed to add other components to a fuel tank to increase the dissipation of electric charges that may form. As a result, the time needed to manufacture aircraft may be increased.

Thus, the different illustrative embodiments provide a method and apparatus for reducing an electric charge on the surface of a structure. In the different illustrative embodiments, an apparatus may comprise a first composite layer and a second composite layer. The second composite layer is associated with the first composite layer. The first composite layer and the second composite layer form a composite structure. The second composite layer has a conductivity configured to dissipate an electric charge on a surface of the structure.

The different illustrative embodiments also recognize and take into account that, in addition to having a conductivity to dissipate electric charges on a surface of a structure, it may be desirable to also limit current flow through the structure caused by an electromagnetic event in a manner that reduces effects on the structure by the electromagnetic event. The limit on the electrical current may reduce formation of inconsistencies, avoid a reduction in the useful life of the structure, and/or other undesirable conditions or effects.

With this consideration in mind, the second composite layer also has a conductivity that is configured to limit a flow of electrical current through the second composite layer in addition to being configured to dissipate an electric charge on the surface of the structure. In particular, it is desirable to limit current flow that may occur from an electromagnetic event. For example, the electromagnetic event may be from the environment around the aircraft, devices in the aircraft, and other suitable sources.

Figure 3:
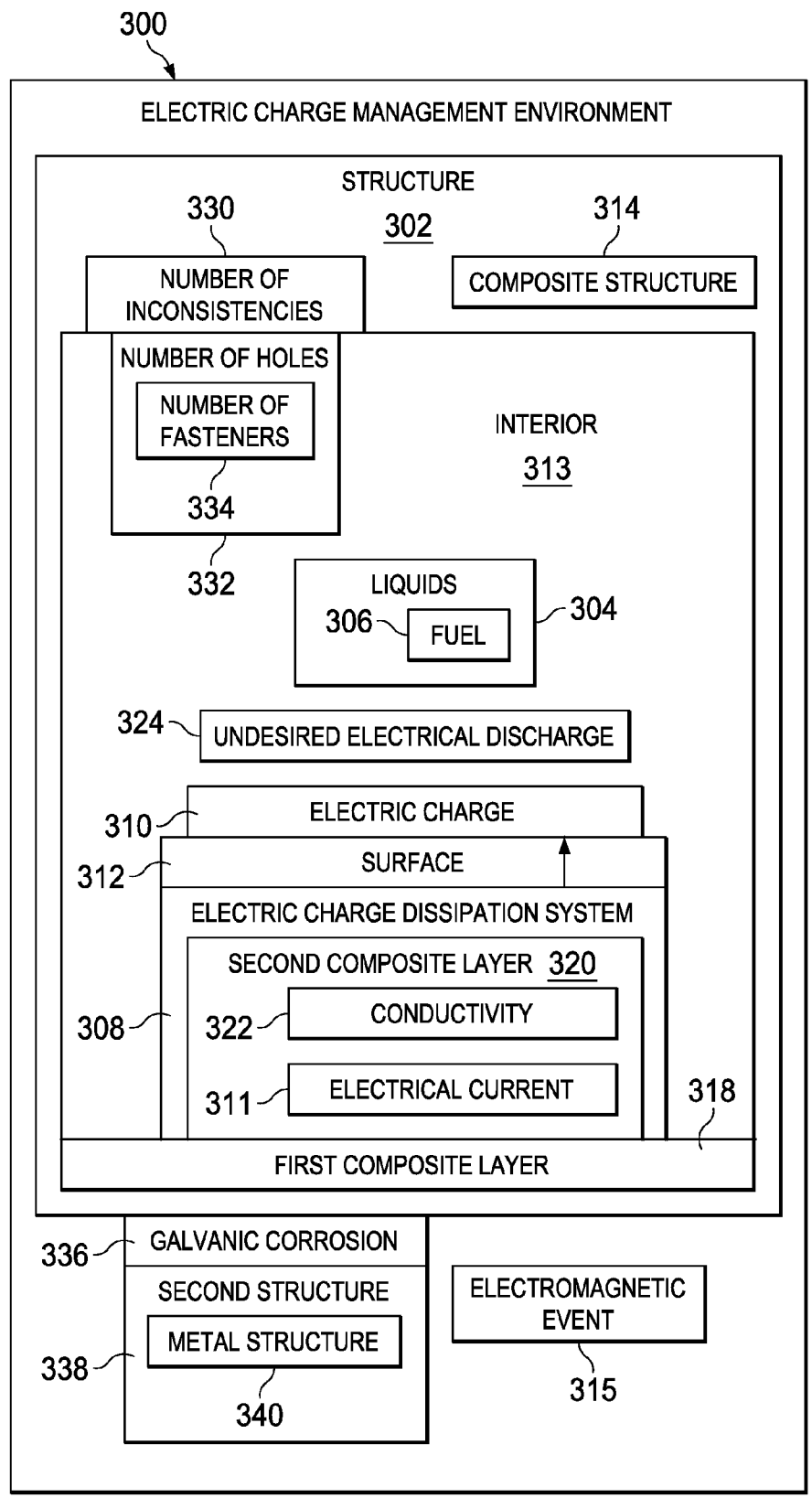
FIG. 3 is an illustration of an electric charge management environment in accordance with an illustrative embodiment.

With reference now to FIG. 3, an illustration of an electric charge management environment is depicted in accordance with an illustrative embodiment. In this illustrative example, electric charge management environment 300 may be implemented using aircraft 200 in FIG. 2.

As depicted, structure 302 may be a structure in aircraft 200 in FIG. 2. In these illustrative examples, structure 302 may hold liquids 304. In particular, structure 302 may be a fuel tank, such as fuel tank 216 in FIG. 2, and liquids 304 may take the form of fuel 306. In particular, structure 302 may be located within wing 218 in FIG. 2 in these illustrative examples.

Electric charge dissipation system 308 may be associated with structure 302. Electric charge dissipation system 308 is configured to dissipate electric charge 310 that may form on surface 312 of structure 302.

In addition, electric charge dissipation system 308 is also configured to limit a flow of electrical current 311 caused by electromagnetic event 315. In these illustrative examples, electromagnetic event 315 is not an event that causes electric charge 310. An electromagnetic event may be caused by an external source to the platform in which composite structure 314 is located or caused by another device in the platform that generates electrical currents.

In these illustrative examples, surface 312 is located in interior 313 of structure 302. In other words, surface 312 is located in interior 313 of the fuel tank.

In these illustrative examples, structure 302 takes the form of composite structure 314. Structure 302 is formed using first composite layer 318. Additionally, electric charge dissipation system 308 includes second composite layer 320. In this illustrative example, second composite layer 320 is located over first composite layer 318.

Second composite layer 320 in electric charge dissipation system 308 may be considered part of structure 302 in these illustrative examples. In other words, second composite layer 320 may be formed at the same time first composite layer 318 is formed for structure 302. As a result, additional time and expense to add electric charge dissipation system 308 to structure 302 after manufacturing of structure 302 may be avoided.

As depicted, first composite layer 318 and second composite layer 320 may be cured at the same time. This type of curing also may be referred to as co-curing.

In these illustrative examples, second composite layer 320 is configured to dissipate electric charge 310 that builds up on surface 312 of structure 302. In this example, second composite layer 320 has conductivity 322. Conductivity 322 allows electric charge 310 to be dissipated from surface 312 of structure 302, while limiting the flow of electrical current 311 in second composite layer 320. The flow of electrical current 311 is limited by second composite layer 320 to an amount that reduces effects from electromagnetic event 315, such as lightning or some other source. In other words, conductivity 322 is high enough to dissipate electric charge 310 to be dissipated from surface 312 but low enough to limit the flow of electrical current 311 caused by electromagnetic event 315, such as a lightning strike.

In this manner, the buildup of electric charge 310 in second composite layer 320 may be reduced and/or prevented. In particular, conductivity 322 of second composite layer 320 allows electric charge 310 to be dissipated to reduce undesired electrical discharge from surface 312 of structure 302. This reduction may include substantially preventing undesired electrical discharge to form on surface 312 of structure 302.

As conductivity 322 of second composite layer 320 increases, the dissipation of electric charge 310 also increases. Conductivity 322 may be measured using resistivity. Resistivity is the inverse of conductivity 322. As one illustrative example, the resistivity for second composite layer 320 that allows dissipation of electric charge 310 may be from about $10^6$ ohms-meters to about $10^9$ ohms-meters. This range of values for resistivity corresponds to a low range of values for conductivity 322.

Further, when conductivity 322 is selected to also limit the flow of electrical current 311, the resistivity of second composite layer 320 may be from about $1 \times 10^6$ ohms-meters to about $1 \times 10^{15}$ ohms-meters. Additionally, in these depicted examples, second composite layer 320 is configured to reduce undesired electrical discharge 324 in interior 313 of structure 302 that is caused by external sources.

Furthermore, second composite layer 320 is configured to limit a flow of electrical current 311 that may be caused by an external source. In particular, the external source may cause an electromagnetic event, such as electromagnetic event 315. By limiting the flow of electrical current 311 through second composite layer 320, the flow of electrical current 311 to interior 313 of structure 302 also may be limited.

These external sources may be any sources that are not part of structure 302. For example, without limitation, an external source, such as lightning, may cause undesired electrical discharge 324 without the use of second composite layer 320.

Further, limiting the flow of electrical current 311 may also occur with electromagnetic event 315 caused by sources associated with structure 302. These sources may be, for example, a power generator, a switch, a computer system, an electrical system, a light system, and other suitable devices that use and/or generate electrical power.

Further, second composite layer 320 also may be configured such that number of inconsistencies 330 in structure 302 may be reduced. Number of inconsistencies 330 may include, for example, without limitation, fiber breakouts, tears, and/or other types of inconsistencies. Number of inconsistencies 330 may form when number of holes 332 for number of fasteners 334 is drilled into structure 302. As number of inconsistencies 330 increases, the number of rework procedures that need to be performed to fix number of inconsistencies 330 may also increase. Second composite layer 320 is configured to reduce number of inconsistencies 330 that is formed in structure 302 to reduce the number of rework procedures that may be needed.

In addition, second composite layer 320 in electric charge dissipation system 308 also may reduce an occurrence of galvanic corrosion 336. Galvanic corrosion 336 is an electrical chemical process in which electrical contact occurs between two different types of metals in the presence of liquid which causes corrosion. Galvanic corrosion 336 may occur where second structure 338 contacts structure 302. In these illustrative examples, second structure 338 is metal structure 340. Second composite layer 320 separates second structure 338 from first composite layer 318 to reduce galvanic corrosion 336.

The illustration of electric charge management environment 300 in FIG. 3 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, structure 302 has been described as a structure in aircraft 200 in FIG. 2. In other illustrative embodiments, structure 302 may be located in other platforms. For example, without limitation, other illustrative embodiments may be applied to a mobile platform, a stationary platform, a land-based structure, an aquatic-based structure, a space-based structure, and/or some other suitable object. More specifically, the different illustrative embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable object.

Still, in other illustrative embodiments, structure 302 may take other forms other than a fuel tank in which liquids 304 are in the form of fuel 306. For example, without limitation, liquids 304 may include other volatile and/or non-volatile liquids. Additionally, structure 302 also may be configured to hold gases in addition to or in place of liquids 304.

As another illustrative example, although only first composite layer 318 and second composite layer 320 are depicted for structure 302 in electric charge management environment 300, other layers may be present in addition to first composite layer 318 and second composite layer 320, depending on the particular implementation.

Figure 4:
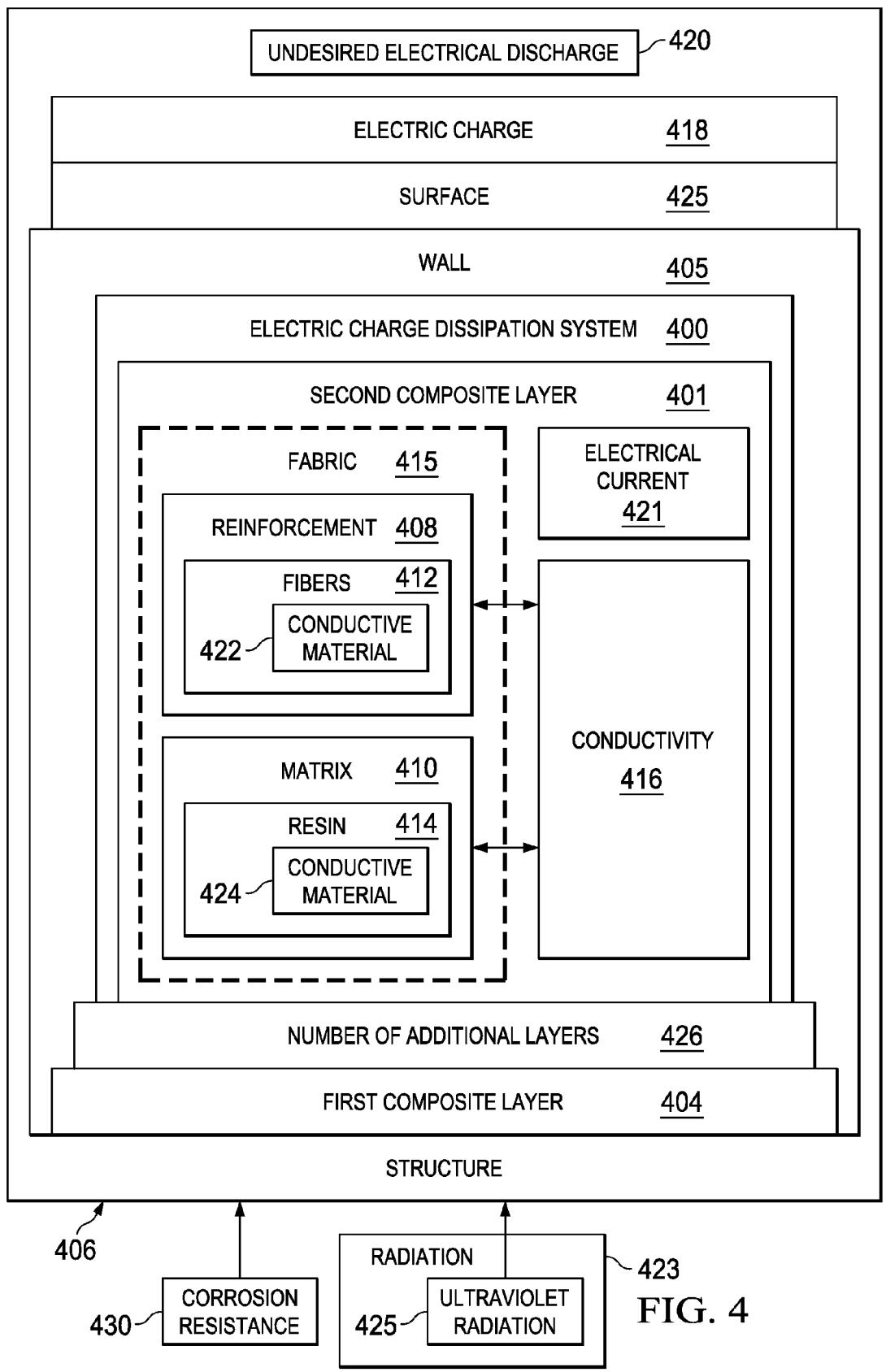
FIG. 4 is an illustration of an electric charge dissipation system in accordance with an illustrative embodiment.

With reference now to FIG. 4, an illustration of an electric charge dissipation system is depicted in accordance with an illustrative embodiment. In this illustrative example, electric charge dissipation system 400 is an example of one implementation of electric charge dissipation system 308 in FIG. 3.

In this depicted example, second composite layer 401 is formed on first composite layer 404 in wall 405 of structure 406. First composite layer 404 is a composite layer for structure 406. In particular, in this illustrative example, first composite layer 404 comprises carbon.

As depicted, second composite layer 401 comprises reinforcement 408. Reinforcement 408 may take the form of fibers 412. In these illustrative examples, fibers 412 may be configured to form fabric 415. In other words, reinforcement 408 may take the form of fabric 415 containing fibers 412. Fabric 415 may be manufactured through weaving, knitting, spreading, bonding, and/or other mechanisms for associating fibers 412 with each other.

In these illustrative examples, second composite layer 401 may also include matrix 410. Matrix 410 may take the form of resin 414. Resin 414 may be infused into fabric 415 to form second composite layer 401. Second composite layer 401 may be, for example, a fiberglass layer or some other suitable type of layer.

In these illustrative examples, fibers 412 may have conductivity 416 such that electric charge 418 can be dissipated from surface 425 of structure 406. Additionally, conductivity 416 may be configured such that undesired electrical discharge 420 is reduced and/or prevented from occurring.

Additionally, in some illustrative examples, fibers 412 also may have conductivity such that flow of electrical current 421 is limited in which electrical current 421 is caused by an electromagnetic event. In particular, flow of electrical current 421 may be limited in second composite layer 401.

As a result, flow of electrical current 421 may be limited in structure 406. With conductivity 416 configured to reduce undesired electrical discharge 420 and flow of electrical current 421, second composite layer 401 may provide galvanic isolation. The reduction in undesired electrical discharge 420 and flow of electrical current 421 may be such that undesired electrical discharge 420 and flow of electrical current 421 may be eliminated. In other words, second composite layer 401 may electrically isolate structure 406 from other structures or components in aircraft 200 in FIG. 2.

In these illustrative examples, fibers 412 may be comprised of a number of different materials. For example, without limitation, fibers 412 may be comprised of at least one of glass, carbon, ceramic, silica, organic materials, plastic, a polymer, nylon, metal, and other suitable types of materials.

Further, in some illustrative examples, fibers 412 may be associated with conductive material 422. Conductive material 422 may be, for example, carbon, a metal, or some other suitable type of conductive material.

In these illustrative examples, one component may be associated with another component in a number of different ways. For example, a first component may be associated with a second component by the first component coating the second component, the first component being formed with the second component, the first component physically contacting the second component in reinforcement 408, and in other suitable ways. For example, a first component, such as fibers 412, may be coated with a second component, such as conductive material 422. In these illustrative examples, at least a portion of fibers 412 may be coated with conductive material 422. The coating is configured to cover at least a portion of fibers 412. The coating may be in the form of a film of material that covers a fiber in fibers 412. In some cases, the coating may be material in the form of a powder that adheres to the fiber. For example, a nano-powder may be used to coat at least a portion of fibers 412. The coating may also be applied such that the material takes the form of a liquid or gas.

In other words, depending on the amount of conductivity 416 desired, some or all of fibers 412 may be coated conductive material 422. In yet another illustrative example, a portion of fibers 412 may be comprised of conductive material 422, while another portion of fibers 412 may not include conductive material 422. Of course, many other variations may be present in the manner in which conductive material 422 may be used with fibers 412 to provide conductivity 416 at a desired level. In some illustrative examples, fibers 412 and/or resin 414 may be doped or treated to provide conductivity 416.

In other illustrative examples, resin 414 may also provide conductivity 416 in place of or in addition to the conductivity in fibers 412. For example, conductivity 416 may be provided through conductive material 424 in resin 414. Conductive material 422 and conductive material 424 may both be present to provide conductivity 416 for second composite layer 401, depending on the particular implementation.

Conductive material 422 and conductive material 424 may be comprised of at least one of, for example, without limitation, a metal, a metal alloy, nickel, carbon, a conductive polymer, titanium dioxide, carbon black, and other suitable types and combinations of materials that may provide a desired level of conductivity 416. Further, conductive material 424 also may be selected to provide protection from degradation that may be caused by radiation 423. Radiation 423 may be, for example, ultraviolet radiation 425. In this manner, the useful life of structure 406 may be increased. Conductive material 422 may also be selected as having an ability to provide corrosion resistance 430 for structure 406.

In this illustrative example, second composite layer 401 is located on first composite layer 404. Of course, second composite layer 401 may be in direct contact with first composite layer 404. In other illustrative examples, second composite layer 401 may be connected to first composite layer 404 through other composite layers, such as number of additional layers 426. Number of additional layers 426 may comprise a number of conductive layers.

Number of additional layers 426 may provide other desirable features. For example, number of additional layers 426 may provide for isolation of structure 406 from another structure in a manner that reduces galvanic corrosion.

The illustration of electric charge dissipation system 400 in FIG. 4 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 5:
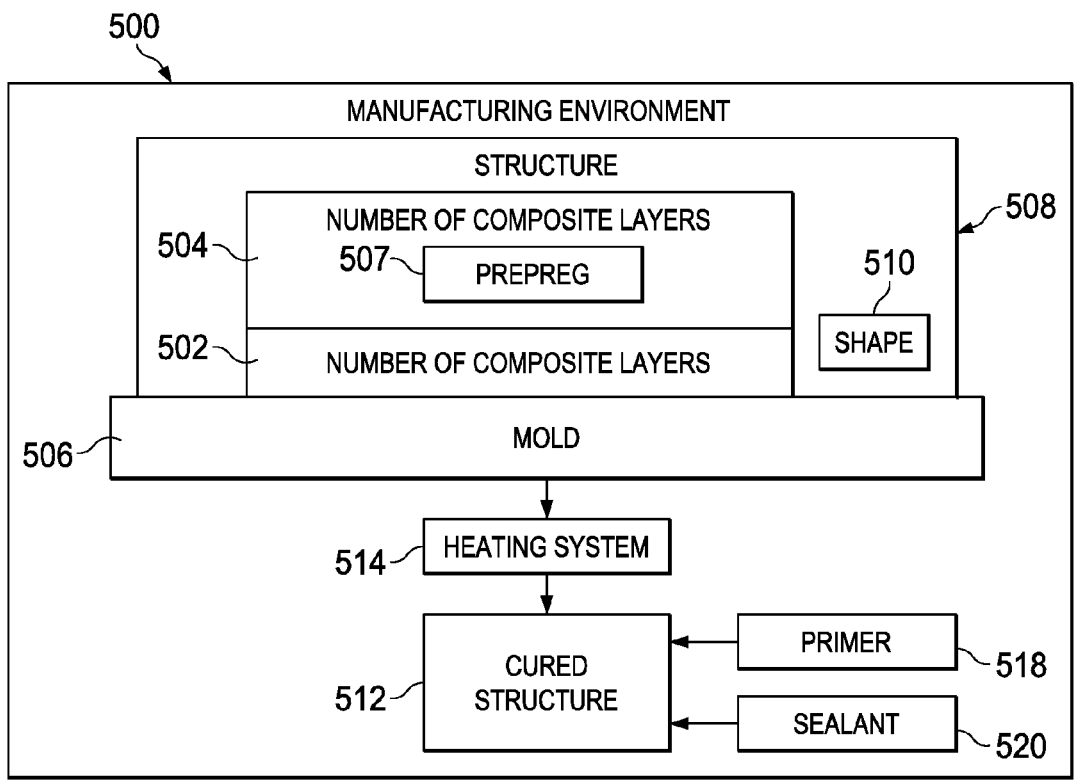
FIG. 5 is an illustration of a manufacturing environment for a structure in accordance with an illustrative embodiment.

With reference now to FIG. 5, an illustration of a manufacturing environment for a structure is depicted in accordance with an illustrative embodiment. In this illustrative example, manufacturing environment 500 is an example of an environment that may be used to manufacture structure 302 in FIG. 3 or structure 406 in FIG. 4.

In these illustrative examples, number of composite layers 502 and number of composite layers 504 may be laid up on mold 506. Mold 506 may take a number of different forms. For example, mold 506 may be an inner-line mold or an outer-line mold in these examples.

Number of composite layers 502 forms composite layers for the wall of a fuel tank in this example. Number of composite layers 504 includes composite layers for an electric charge dissipation system in these depicted examples. For example, number of composite layers 502 may comprise first composite layer 404 in FIG. 4. Number of composite layers 504 may include second composite layer 401 in FIG. 4. Additionally, number of additional layers 426 in FIG. 4 also may be present in number of composite layers 504.

Number of composite layers 504 may take the form of prepreg 507. In other words, number of composite layers 504 may be ready for curing without requiring infusion of resin when placed onto number of composite layers 502 in these illustrative examples.

After number of composite layers 504 and number of composite layers 502 have been laid up on mold 506, structure 508 has shape 510 and is ready for curing. Mold 506 with structure 508 may be cured using heating system 514. Heating system 514 may provide both heat and a vacuum, depending on the particular implementation. Heating system 514 may include, for example, without limitation, an autoclave, an oven, a heating blanket, and/or some other suitable type of heating device. Of course, any heat source suitable for curing composite materials may be employed.

In these illustrative examples, structure 508 may be a fuel tank in a wing of an aircraft. After curing structure 508, cured structure 512 is formed. Thereafter, primer 518, sealant 520, and/or other suitable layers may be added to cured structure 512, depending on the particular implementation.

Figure 6:
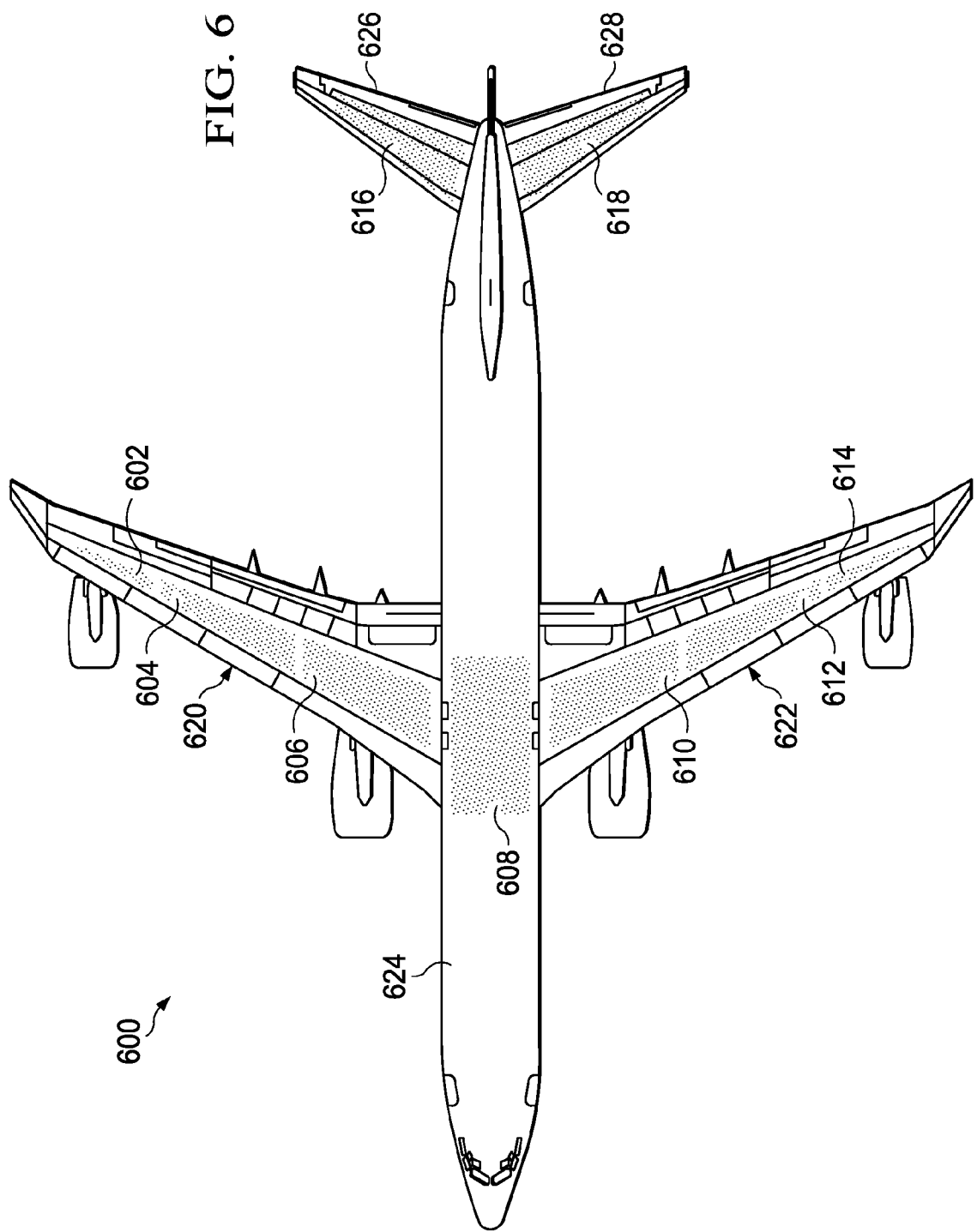
FIG. 6 is an illustration of an aircraft with fuel tanks in accordance with an illustrative embodiment.

With reference now to FIG. 6, an illustration of an aircraft with fuel tanks is depicted in accordance with an illustrative embodiment. In this depicted example, aircraft 600 is an example of one implementation of aircraft 200 in FIG. 2. In this example, fuel tanks 602, 604, 606, 608, 610, 612, 614, 616, and 618 are located in aircraft 600.

Fuel tanks 602, 604, and 606 are located in wing 620; while fuel tanks 610, 612, and 614 are located in wing 622. Fuel tank 608 is located in fuselage 624. Fuel tanks 616 and 618 are located in horizontal stabilizers 626 and 628, respectively.

In these illustrative examples, electric charge dissipation system 308 in FIG. 3 and electric charge dissipation system 400 in FIG. 4 may be implemented in at least one of fuel tanks 602, 604, 606, 608, 610, 612, 614, 616, and 618.

Figure 7:
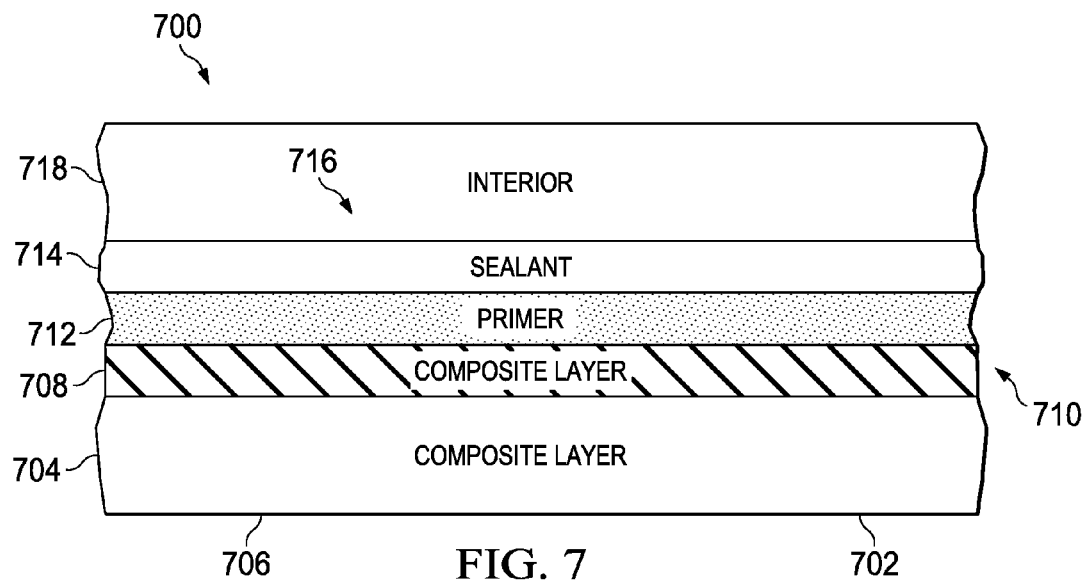
FIG. 7 is an illustration of a cross section of a structure in accordance with an illustrative embodiment.

With reference now to FIG. 7, an illustration of a cross section of a structure is depicted in accordance with an illustrative embodiment. In this illustrative example, cross section 700 is a cross section from a fuel tank, such as fuel tank 602 in FIG. 6. Of course, cross section 700 may be employed in any fuel tank illustrated for aircraft 600 in FIG. 6.

In this illustrative example, structure 702 in cross section 700 is a portion of fuel tank 602 in FIG. 6. In this illustrative example, composite layer 704 forms wall 706 of fuel tank 602.

As depicted, composite layer 708 comprises a portion of electric charge dissipation system 710. Electric charge dissipation system 710 is an example of one implementation for electric charge dissipation system 308 in FIG. 3 and electric charge dissipation system 400 in FIG. 4.

In this depicted example, composite layer 708 is in contact with composite layer 704. Primer 712 also may be part of electric charge dissipation system 710. In this example, primer 712 may be comprised of a material that may also aid in dissipating electric charges. Sealant 714 is formed on primer 712 in these illustrative examples.

In these illustrative examples, composite layer 708 may be configured to have conductivity such that electric charge that forms on surface 716 of fuel tank 602 may be dissipated. Additionally, composite layer 708 also may be configured to reduce or prevent undesired electrical discharge caused by electrical currents generated by external sources. Composite layer 708 also may be configured to reduce and/or prevent undesired electrical discharge in fuel tank interior 718 that may occur in or travel through composite layer 704.

Further, composite layer 708 also may be configured to limit a flow of electrical current through composite layer 708. As a result, a flow of an electrical current to surface 716 of fuel tank 602 may be limited. Further, a flow of electrical current to other structures contacting fuel tank 602 also may be limited.

Also, composite layer 708 may be configured to reduce galvanic corrosion from occurring from other structures that may contact fuel tank 602. In another illustrative example, composite layer 708 may be configured to reduce degradation of fuel tank 602 from exposure to ultraviolet radiation.

Figure 8:
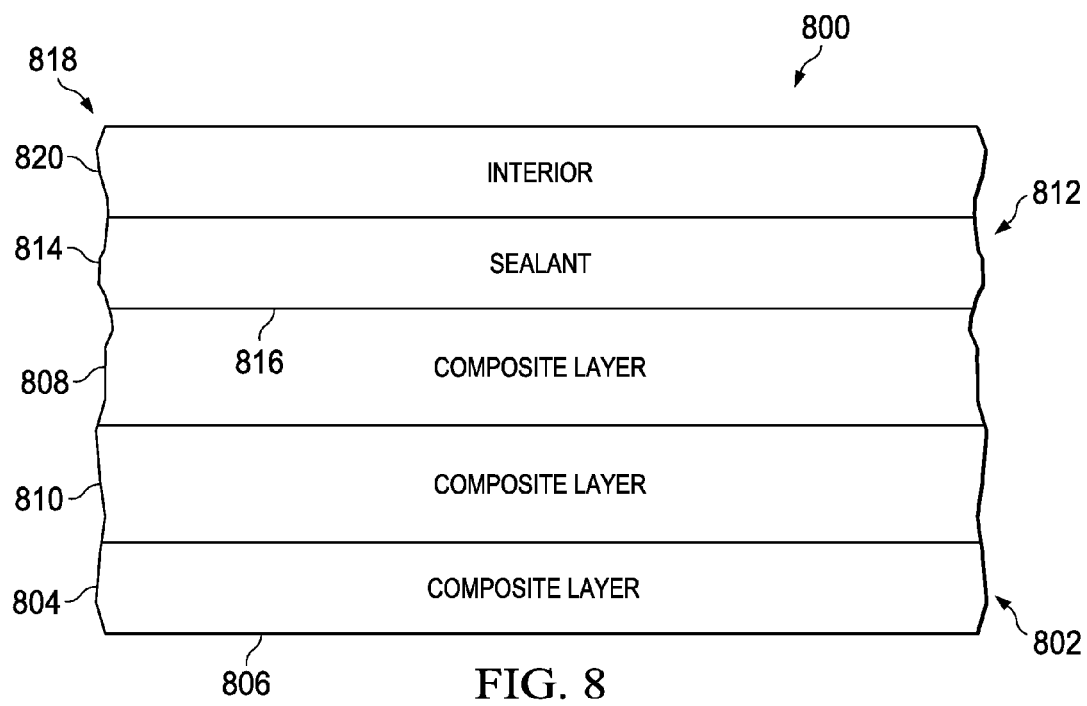
FIG. 8 is an illustration of a cross-sectional view of a portion of a fuel tank in accordance with an illustrative embodiment.

Turning next to FIG. 8, an illustration of a cross-sectional view of a portion of a fuel tank is depicted in accordance with an illustrative embodiment. Structure 800 in cross section 802 is for a portion of fuel tank 602 in FIG. 6 in this illustrative example. Composite layer 804 forms wall 806 of fuel tank 602 in FIG. 6.

As depicted, composite layer 808 is located on composite layer 804. Additionally, composite layer 810 also may be located between composite layer 808 and composite layer 804. Composite layer 808 and composite layer 810 may form electric charge dissipation system 812 in this particular example. Electric charge dissipation system 812 may be an example of an implementation of electric charge dissipation system 308 in FIG. 3 and electric charge dissipation system 400 in FIG. 4.

As illustrated, sealant 814 may be applied to surface 816 of composite layer 808. In this particular example, a primer is not present. Composite layer 808 is configured to dissipate an electric charge that may form on surface 818 of structure 800 for fuel tank 602.

Additionally, composite layer 808 also may be configured to reduce and/or prevent undesired electrical discharge in fuel tank interior 820 that may occur in or travel through composite layer 804, as well as limit a flow of electrical current in composite layer 804 in which the electrical current is caused by an electromagnetic event.

The illustration of different components in fuel tank 602 in FIG. 7 and FIG. 8 are presented for purposes of showing one implementation of an electric charge dissipation system. The different components shown in FIG. 7 and FIG. 8 may be combined with components in FIG. 2-5, used with components in FIGS. 2-5, or a combination of the two. Additionally, some of the components in FIG. 7 and FIG. 8 may be illustrative examples of how components shown in block form in FIGS. 2-5 can be implemented as physical structures.

Further, other electric charge dissipation systems may have other configurations. For example, in some illustrative examples, sealant 714 and primer 712 may be unnecessary. In still yet other illustrative examples, other layers may be present between composite layer 808 and composite layer 804. For example, another composite layer or another material, such as fiberglass, may be located between composite layer 808 and composite layer 804.

As another example, additional composite layers may be present in structure 800 in electric charge dissipation system 812 in addition to the ones illustrated. In addition, in some illustrative examples, paint or primer also may be present on surface 816 of composite layer 808.

In these depicted examples, composite layer 804 and composite layer 808 are laid up on a mold. These composite layers are cured to form fuel tank 602. As a result, additional operations are unneeded to add electric charge dissipation system 812 to fuel tank 602 at a later time, as compared to currently available electric charge dissipation systems.

Figure 9:
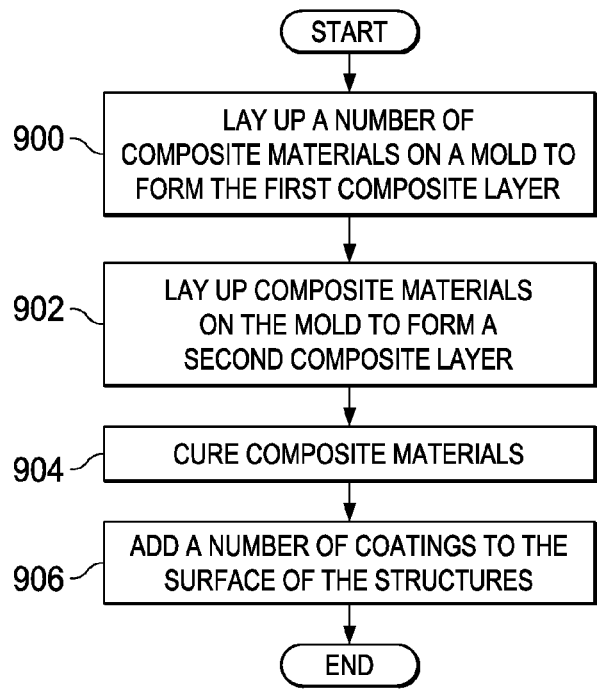
FIG. 9 is an illustration of a flowchart of a process for manufacturing a structure with an electric charge dissipation system in accordance with an illustrative embodiment.

With reference now to FIG. 9, an illustration of a flowchart of a process for manufacturing a structure with an electric charge dissipation system is depicted in accordance with an illustrative embodiment. The process illustrated in FIG. 9 may be implemented to manufacture a structure, such as structure 302 in FIG. 3 and/or structure 406 in FIG. 4, in accordance with an illustrative embodiment. The process illustrated in this figure may be implemented using manufacturing environment 500 in FIG. 5.

The process begins by laying up a number of composite materials on a mold to form a first composite layer (operation 900). This number of composite materials may be the composite materials for a composite layer, such as first composite layer 318 in FIG. 3. Thereafter, composite materials are laid up on the mold to form a second composite layer (operation 902). This second composite layer is second composite layer 320 in FIG. 3.

Thereafter, the composite materials are cured (operation 904). The process then adds a number of coatings to the surface of the structures (operation 906), with the process terminating thereafter. These coatings may include, for example, without limitation, a primer, a sealant, paint, and other suitable types of coatings.

Figure 10:
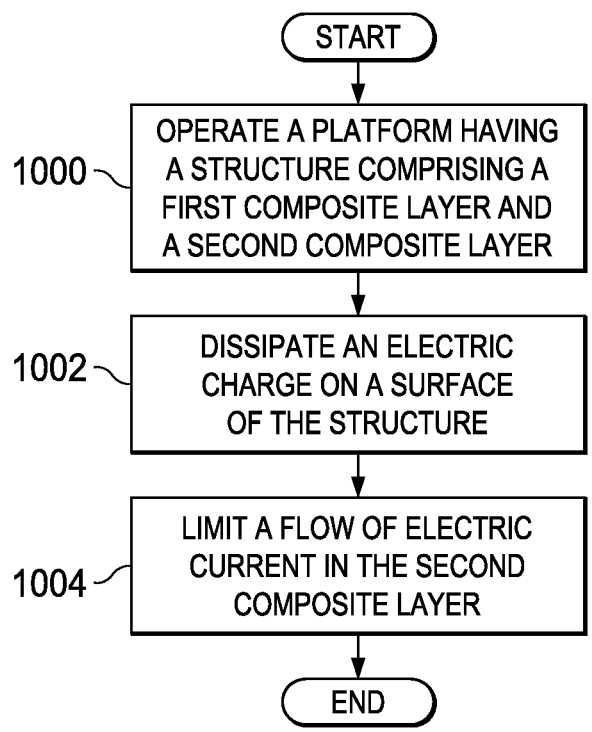
FIG. 10 is an illustration of a flowchart of a process to operate a platform in accordance with an illustrative embodiment.

With reference now to FIG. 10, an illustration of a flowchart of a process to operate a platform is depicted in accordance with an illustrative embodiment. The process illustrated in FIG. 10 may be implemented in a platform, such as aircraft 200 in FIG. 2. Further, this process may be implemented in other types of platforms.

The process begins by operating a platform having a structure comprising a first composite layer and a second composite layer (operation 1000). In this illustrative example, the second composite layer is associated with the first composite layer.

The process dissipates an electric charge on a surface of the structure (operation 1002). The process also limits a flow of electric current in the second composite layer (operation 1004), with the process terminating thereafter.

The flowcharts and block diagrams in the different depicted embodiments illustrate the architecture, functionality, and operation of some possible implementations of apparatuses and methods in different illustrative embodiments. In this regard, each block in the flowcharts or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, operation 1002 and operation 1004 in FIG. 10 may be performed concurrently or in reverse order, depending on the particular implementation. Further, in some illustrative examples, operation 906 in FIG. 9 may not be performed to add coatings to the structures, depending on the particular implementation. In still yet other illustrative embodiments, additional layers may be included in addition to the composite layer forming the structure and the composite layer for the electric charge dissipation system.

Thus, the different illustrative embodiments provide a method and apparatus for managing electric charges. In one illustrative embodiment, an apparatus comprises a composite layer and a fabric layer. The composite layer is located on the fabric layer. The composite layer and the fabric layer form a structure. The fabric layer is configured to dissipate an electric charge on the surface of the structure and limit a flow of an electrical current in fabric in which the electrical current is caused by an electromagnetic event.

In addition, the fabric layer may be configured to reduce or prevent a flow of an electric charge, limit a flow of an electrical current in fabric, or a combination of the two that may occur in response to different events. Further, the fabric layer also may be configured to reduce galvanic corrosion that may occur from the structure contacting another structure.

In this manner, the different illustrative embodiments may provide dissipation of electric charges and limit a flow of an electrical current in a manner that may require less expense, less complexity, and less time to implement, as compared to currently available systems.

For example, by forming the electric charge dissipation system at the same time as the structure, additional operations to add the electric charge dissipation system may be avoided.

Further, with the use of one or more composite layers configured to dissipate an electric charge, the different illustrative embodiments may have a reduced weight and complexity, as compared to other types of electric charge dissipation systems. For example, the electric charge dissipation system in the different illustrative examples may be integrated as part of the structure itself. The addition of coatings, such as primers or other materials, to the surface of the structure may be avoided using the different illustrative embodiments.

A composite layer constructed in accordance with an illustrative embodiment may be used in the fuel tank. The composite layer has a conductivity that is high enough to dissipate an electric charge from a surface of the interior of the fuel tank, but the conductivity is low enough to limit the flow of an electric current to the surface of the interior of the fuel tank or elsewhere in the fuel tank. In the illustrative examples, the current may be caused by an electromagnetic event.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus that comprises:
   a first composite layer, such that the first composite layer comprises a carbon fiber reinforced material;
   a second composite layer co-cured to an interior side of the first composite layer, such that a fuel tank comprises the first composite layer and the second composite layer, and the second composite layer comprises a resin that comprises a resistivity range from $1\times10^6$ ohms-meters to $1\times10^{15}$ ohms-meters and completely covers a surface of the first composite layer and comprises a configuration such that in operation the second composite layer:
      dissipates a static electric charge that builds on a surface of an interior of the fuel tank; and
      limits a flow of an electrical current, in response to an electromagnetic event distinct from the static electric charge, through the first and second composite layer, such that the configuration of the second composite layer inhibits an electrical discharge into the interior of the fuel tank;
   a primer layer, located between the second composite layer and the interior of the fuel tank, configured to dissipate, such that in operation the primer layer dissipates, the static electric charge, and such that the primer layer coats a surface of the second composite layer entirely; and
   a sealant layer located between the primer layer and the interior, such that the sealant layer coats a surface of the primer layer entirely.

2. The apparatus of claim 1, wherein at least one of: the primer layer, and a third composite layer, reduces galvanic corrosion that occurs when a structure other than the fuel tank contacts the fuel tank.

3. The apparatus of claim 1 further comprising:
   a number of composite layers located between the first composite layer and the second composite layer.

4. The apparatus of claim 1, wherein the second composite layer comprises fibers and wherein the fibers are comprised of a material selected from at least one: of glass, carbon, ceramic, silica, organic materials, plastic, a polymer, nylon, and metal.

5. The apparatus of claim 1, wherein the second composite layer includes a conductive material selected from one of a metal, a metal alloy, nickel, carbon, a conductive polymer, titanium dioxide, and carbon black.

6. The apparatus of claim 1, wherein the second composite layer comprises fibers comprising at least one of: a conductive material, and a coating comprising a second conductive material.

7. The apparatus of claim 6, wherein the coating comprises at least one of: a powder that adheres to the fibers, and wherein the powder comprises a nano-powder that adheres to at least a portion of the fibers.

8. The apparatus of claim 1, wherein the second composite layer comprises fibers that form a reinforcement and the resin that forms a matrix in the reinforcement.

9. The apparatus of claim 8, wherein the resin provides a conductivity that dissipates the static electric charge on the surface of the fuel tank and limits the flow of the electrical current in the second composite layer.

10. The apparatus of claim 1, wherein the second composite layer is a fiberglass layer.

11. The apparatus of claim 1, wherein the second composite layer comprises a prepreg material.

12. The apparatus of claim 1, further comprising a conductive material selected from a group consisting of: a metal, a metal alloy, nickel, carbon, a conductive polymer, titanium dioxide, and carbon black.

13. The apparatus of claim 1, further comprising a conductive material comprising carbon black.

14. The apparatus of claim 1, further comprising the electromagnetic event comprising lightning.

15. The apparatus of claim 1, further comprising the sealant layer that comprises characteristics that allow application as a post composite cure layer.

16. An electric charge dissipation system for a tank, such that the electric charge dissipation system comprises:
   a first composite layer co-cured to an interior side of a second composite layer, such that the first composite layer comprises a carbon fiber material and an external surface of the tank, and the second composite layer comprises:
      a second surface, that faces an interior of the tank, of the tank;
      a first conductivity sufficient to dissipate an electric charge on an interior surface of the tank; and
      a resistivity that ranges from $1\times10^6$ ohms-meters to $1\times10^{15}$ ohms-meters configured to limit, in response to an electromagnetic event distinct from the electric charge, a flow of an electrical current through the second composite layer, such that a configuration of the second composite layer inhibits an electrical discharge into the tank;

a primer layer, located between the second composite layer and the interior of the tank, configured to dissipate the electric charge, and a second resistivity sufficient to inhibit the electrical discharge; and a sealant layer located between the primer layer and the interior of the tank, such that the sealant layer coats a surface of the primer layer entirely.

17. A tank configured to retain at least one of: a liquid, and a gas, such that the tank comprises:

a first composite layer, such that the first composite layer comprises a carbon fiber reinforced material;

a second composite layer co-cured to the first composite layer, such that the second composite layer comprises a resin configured to dissipates a static electric charge, on a surface of an interior of the tank, via a resistivity range from $1 \times 10^6$ ohms-meters to $1 \times 10^9$ ohms-meters, and completely covers a surface of the first composite layer; and a primer layer, located between the second composite layer and the interior of the tank, configured to dissipate, such that in operation the primer layer also dissipates, the static electric charge, on the surface of an interior of the tank, and such that the primer layer coats a surface of the second composite layer entirely; and a sealant layer located between the primer layer and the interior, such that the sealant layer coats a surface of the primer layer entirely.

18. The tank of claim 17, further comprising the second composite layer further configured to limit a flow of an electrical current, in response to an electromagnetic event distinct from the static electric charge, through the first and second composite layer, such that a configuration of the second composite layer inhibits an electrical discharge into the interior of the tank, via the resin comprising a resistivity range from $1 \times 10^6$ ohms-meters to $1 \times 10^{15}$ ohms-meters.

19. The tank of claim 17, further comprising the at least one of: the liquid, and the gas, being a volatile fuel.

20. The tank of claim 17, further comprising the liquid being a fuel for an aircraft.

* * * * *